United States Patent Office

3,485,775
Patented Dec. 23, 1969

3,485,775
VINYL CHLORIDE RESIN PROCESSING AID IMPARTING IMPROVED HEAT DISTORTION CHARACTERISTICS
Harry J. Cenci, Warminster, and Marvin J. Hurwitz, Elkins Park, Pa., assignors to Rohm and Haas Company, Philadelphia, Pa., a corporation of Delaware
No Drawing. Continuation-in-part of application Ser. No. 644,473, June 8, 1967. This application Apr. 22, 1968, Ser. No. 723,289
Int. Cl. C08f 29/24, 29/22
U.S. Cl. 260—899    7 Claims

ABSTRACT OF THE DISCLOSURE

Rigid vinyl chloride resin compositions of high service temperature are provided by preparing a blend of polyvinyl chloride and a copolymer modifier of a bicyclic methacrylate ester and methyl methacrylate. The copolymer modifier functions both as a processing aid and heat distortion temperature improver.

---

This application is a continuation-in-part of pending application Ser. No. 644,473, filed June 8, 1967, now abandoned.

This invention relates to homogeneous thermoplastic vinyl chloride resin compositions possessing excellent physical properties and, more particularly, to hard, strong, and rigid but processable compositions comprising an intimate mixture or blend of a vinyl chloride resin and an acrylic copolymer of a bicyclic methacrylate and methyl methacrylate. The bicyclic methacrylate ester contains a methacryloyl radical or group bonded to a six-membered carbon atom bridged ring and has the following Formula I:

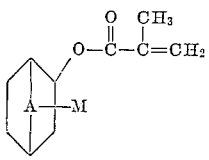

where:
A is —CH$_2$—, —CH(CH$_3$)—, or —C(CH$_3$)$_2$—, and
M is selected from the group consisting of a hydrogen atom and a methyl group or a plurality thereof. Exemplary of such bicyclic methacrylate esters are isobornyl methacrylate, bornyl methacrylate, fenchyl methacrylate, isofenchyl methacrylate, and norbornyl methacrylate and mixtures of such bicyclic methacrylates. These esters are known compounds and may be prepared in known fashion. For example, bornyl methacrylate may be prepared from α-pinene and methacrylic acid and the isobornyl ester can be prepared from camphene and methacrylic acid in known manner.

Rigid vinyl chloride resinous compositions, i.e., compositions containing less than about 5 to 10% plasticizer, are characterized by a high degree of resistance to chemical attack, by outstanding solvent resistance, by good weathering resistance, and by a high strength to weight ratio and, consequently, have come into extensive use in the chemical processing and building and construction industries. Rigid vinyl chloride resin compositions are presently finding use in such applications as, for example, chemical processing equipment, pipes and pipe fittings, moldings, sheeting, building panels, etc. The processing of rigid resinous vinyl chloride products is not, however, accomplished without serious problems and difficulty. One problem is that the extrusion or milling temperatures are extremely close to the point at which the material will degrade and the utmost care must be exercised during extrusion or milling not to exceed the degradation temperature by any significant amount. Moreover, rigid vinyl chloride resins do not achieve melt flow as readily as other thermoplastics, but instead are somewhat more viscous during processing. This subjects the resins to a high shear which in turn creates additional heat, further tending to cause the material to degrade and break down.

Another problem present with rigid vinyl chloride compositions is that articles fabricated therefrom have relatively low service temperature. In practice, the practical service temperature of thermoplastic bodies is dictated by the softening temperature of the thermoplastic material, or by its heat distortion temperature, a term denoting the lowest temperature at which a material being tested, of specific dimensions, yields a specified distance under a specified loading. For example, the heat distortion temperature of polyvinyl chloride at 264 p.s.i. loading is about 75° C., a temperature which prevents the material from finding use in many applications; for example, in hot-fill food packaging applications, or in applications involving sterilization temperatures approximating that of boiling water. It is thus apparent that there is great need for an additive which will both aid the processing and heat distortion characteristics of rigid vinyl chloride resins.

The processing and heat distortion temperature aids employed in the composition of the present invention are thermoplastic, clear, and transparent, solid, non-rubbery copolymers of a bicyclic methacrylate ester of Formula I, as hereinbefore defined, and methyl methacrylate. Preferably, the bicyclic methacrylate ester is isobornyl methacrylate, bornyl methacrylate or a mixture is isobornyl and bornyl methacrylates having at least 10 weight percent isobornyl methacrylate. The respective proportions or amounts of the essential and required monomers in the copolymer additive may vary as follows: 25 to 75 parts by weight for the bicyclic methacrylate, and correspondingly, 75 to 25 parts by weight for the methyl methacrylate. If desired, a minor amount, up to about 10% by weight, of the combined weight of the bicyclic methacrylate and the methyl methacrylate, of a C$_1$ to C$_4$ alkyl acrylate and/or up to about 10% by weight of styrene or a ring-substituted styrene, based on the combined weight of the bicyclic methacrylate and the methyl methacrylate, may be incorporated in the copolymer. Preferred alkyl acrylates are ethyl and butyl acrylate and while styrene is preferred as the other optional monomer, other alkyl-substituted or halogen-substituted styrenes may be used, such as for example, methyl styrene, dimethyl styrene, meta- and ortho-chlorostyrenes, etc. Preferably, the bicyclic methacrylate is present in the range of about 35 to 65 parts by weight for each 65 to 35 parts by weight of methyl methacrylate. The number average molecular weight of the copolymer additive as measured on a Mechrolab Osmometer Model 501 in monochlorobenzene through gel cellophane No. 600 ranges desirably from about 10,000 to 1,500,000 and above of which the range 15,000 to 1,000,000 is preferred and of which the range 15,000 to 50,000 is more preferred. The estimated intrinsic viscosity of the copolymer additive in ethylene dichloride, at 30° C. measured on an Ostwald viscometer preferably ranges from about 0.1 to 2.0 and above (dl./gr.). When ethyl acrylate, butyl acrylate and/or styrene is present, the copolymer composition varies as follows: 25 to 75 parts by weight of bicyclic methacrylate, 75 to 25 parts by weight of methyl methacrylate, 0 to 10 parts by weight of ethyl acrylate or butyl acrylate (for each 100 parts by weight of bicyclic methacrylate and methyl methacrylate) and 0 to 10 parts by weight of styrene (for each 100 parts by weight of bicyclic methacrylate and methyl methacrylate). Preferred ranges for the optional monomers are 1 to 5 parts by weight for the alkyl acrylate such as ethyl or butyl acrylate, and 2 to 8 parts for the styrene or ring-substituted styrene.

The copolymer additives of the invention may be made by a variety of methods. One suitable method is by bulk polymerization of the monomeric ingredients. In accordance with that process a suitable amount of monomers is mixed with an addition polymerization catalyst, such as azobisisobutyronitrile, lauroyl peroxide, acetyl peroxide, t-butyl peracetate, t-butyl hydroperoxide, etc., at a temperature sufficient to cause polymerization such as in the range of 25° to 100° C. or higher. Another suitable method for making the copolymer of the invention is by an aqueous dispersion method. In this procedure the necessary copolymerizable monomers are polymerized as an emulsion in the presence of a suitable emulsifying agent such as sodium dodecylbenzene sulfonate or sodium lauryl sulfate, and the resuling polymer is recovered by a suitable method. Commonly used molecular weight regulators such as the aliphatic mercaptans, for example, n-dodecyl mercaptan, may also be included in the polymerization mixture, if desired.

The vinyl chloride resins useful in this invention include homopolymers of vinyl chlorides as well as copolymers thereof with minor proportions of other ethylenically unsaturated compounds. Preferably, the vinyl chloride resin employed is a homopolymer of vinyl chloride, i.e., polyvinyl chloride, since the most rigid compositions are ultimately obtainable therefrom. However, the vinyl chloride resin can also contain up to about twenty percent by weight of other ethylenically unsaturated compounds copolymerizable with vinyl chloride; conversely stated, the resin should contain at least about 80 percent by weight of vinyl chloride copolymerized therein. Other ethylenically unsaturated compounds which are suitable in this respect include, for example, vinyl alkanoate, such as viny acetate, vinyl propionate, and the like; vinyl halides, such as vinyidene bromide, vinylidene chloride, vinylidene fluorochloride, and the like; unsaturated hydrocarbons, such as ethylene, propylene, isobutylene and the like; allyl compounds such as allyl acetate, allyl chloride, allyl ethyl ether and the like, etc. Thus, as employed herein, the term "vinyl chloride resin" is meant to include both polyvinyl chloride, and copolymers of vinyl chloride with other ethylenically unsaturated monomers.

The molecular weight of the vinyl chloride resins suitable for use in this invention can vary over a wide range. An indication of the molecular weight of those vinyl chloride resins particularly useful in this invention may be obtained by reference to the resin's Fikentscher K-value and those resins having a Fikentscher K-value of about 45 and higher, and preferably between 45 and 90 may be taken as conforming to the molecular weight requirement mentioned above.

The vinyl chloride resin compositions of the invention contain the acrylic copolymer additive in an effective amount, i.e., in an amount sufficient to give satisfactory processing and heat distortion temperature improvement. Generally, this amount is kept to a minimum, consistent with the benefits desired. In practice, an amount in the range of about 5 to 50% by weight based upon the total combined weight of the copolymer additive and the vinyl chloride resin is generally adequate, although slightly greater or lesser amounts may be used. Preferably, the modifier copolymer is used in the 25 to 50% by weight range. The vinyl chloride resin comprises the balance; i.e., 95 to 50% by weight based on the total combined weight of modifier and resin, and, more preferably, 75 to 50% by weight.

By using the acrylic copolymer additive, there is formed a blend with vinyl chloride resins which is an extrudable, millable and workable plastic composition. A smooth, flexible polyvinyl chloride sheet is formed during processing by the use of the acrylic copolymer additive which upon cooling gives a rigid product which is a homogeneous blend of the vinyl chloride resin and the copolymer. The use herein of the descriptive term "homogeneous" refers to the composition that is intimately mixed or blended and is well dispersed so that the composition is uniform throughout. This homogeneous blend of the components in the composition of the invention is characterized in that they are essentially miscible and compatible. Thus the composition of this invention is further characterized by a high degree of clarity. This composition exhibits good thermal stablity. It also has very good light stability. Moreover, the composition shows a significantly improved heat distortion temperature. Additionally, the compositions of the present invention are essentially non-burning or self-extinguishing, a result which is surprising in view of the known effect in this regard of prior art acrylic modifiers.

In the vinyl chloride resin compositions of the invention there may be used in addition to the copolymer additional materials such as extenders, fillers, dyes, pigments, and stabilizers. The copolymers may be the sole processing aid employed, or they may be used in conjunction with other conventional materials.

The examples which are provided below are merely illustrative of the invention. All parts, ratios and percentages are by weight unless otherwise mentioned. The following abbreviations are used: MMA for methyl methacrylate, IBOMA for isobornyl methacrylate, and EA for ethyl acrylate.

EXAMPLE 1

(a) There is charged to a suitable container a vacuum-degassed mixture of 1640 parts of methyl methacrylate, 2460 parts of isobornyl methacrylate, 1.44 parts of lauroyl peroxide, 0.70 part of acetyl peroxide, 0.62 part of t-butyl hydroperoxide, and 0.41 part of n-dodecyl mercaptan. The container is placed in a forced air oven and bulk polymerized at 66° C. for 15 hours, followed by a finish-off period for 8 hours, at increasing temperatures of from 80° C. to 130° C. The resultant slab is broken and ground into granules which are extracted with boiling hexane and dried at 60° C. to reduce the residual monomer level to less than 0.15%. The product is a 60/40 copolymer of isobornyl methacrylate/methyl methacrylate and has a Gardner-Holdt viscosity of C (10% in toluene), and an intrinsic viscosity of about 1.5 (in ethylene dichloride, dl./gr.).

(b) By adjustment of the monomer ratios and following the procedure of (a) above, there is obtained a copolymer of the following composition: 40/60 IBOMA/MMA with an intrinsic viscosity of 0.4 (in ethylene dichloride, dl./gr.).

(c) A mixture of 60 parts isobornyl methacrylate, 38 parts methyl methacrylate and 2 parts ethyl acrylate is polymerized in bulk, in the presence of a peroxide catalyst, for 12–16 hours at 66° C. followed by a finish-off period of 20–24 hours at 120° C. The 60/38/2 isobornyl methacrylate/methyl methacrylate/ethyl acrylate copolymer is a clear, transparent solid and has an intrinsic viscosity (in ethylene dichloride, dl./gr.) of about 0.5–0.6.

(d) By adjustment of the monomer ratios and following the procedure of (c) above, there is obtained a copolymer of the following composition: IBOMA/MMA/EA: 40/58/2. This copolymer has an intrinsic viscosity of 0.89 (in ethylene dichloride, dl./gr.).

EXAMPLE 2

To a suitable reactor equipped with stirrer, thermometer, nitrogen sweep, inlets for monomer addition and reflux condenser, there are charged 700 parts of water and a total of 318 parts of the following monomers: isobornyl methacrylate—150 parts, methyl methacrylate—144 parts, ethyl acrylate—6 parts, and styrene—18 parts. Sodium lauryl sulfate emulsifier (0.5%) a small amount of t-butyl mercaptan, and sufficient potassium persulfate initiator to initiate polymerization are added and the mass is emulsion polymerized for a period of about 3 to 4 hours over a temperature range starting at 65° C. and ending at about 95 to 98° C. The emulsion is then cooled, isolated by coagulation or spray dried. The product is a 50/48/2/6 IBOMA/MMA/EA/Styrene copolymer.

In the practice of this invention, the vinyl chloride resin and the copolymer modifier additive can be blended in any convenient manner and order. A suitable procedure, for instance, involves manually or mechanically admixing the resins in proportions as hereinabove described in an unheated container and adding the dry-blended mixture to an equal speed or differential roll speed two roll mill maintained at a temperature of about 350° F. to 400° F. Other methods of processing are equally effective. For example, the resin mixture can be added to a hot Banbury mill for fluxing and homogenizing and then fed to a hot roll mill or calender for a sheeting operation. Still other methods of processing will occur to those skilled in the art and can be employed satisfactorily in accordance with this invention to provide a homogeneous blend of the vinyl chloride resin and acrylic copolymer additive.

INCORPORATION OF PROCESSING AND HEAT DISTORTION TEMPERATURE AID INTO POLYVINYL CHLORIDE

The following ingredients are dry-blended for a few minutes: polyvinyl chloride (hereinafter abbreviated PVC), 100–X parts; copolymer processing additive prepared according to Example 1 or Example 2, X parts; and 3 parts of barium-cadmium laurate stabilizer. After dry-blending, the samples are milled on a two-roll mill at 365° F. for 10 minutes after flux. Processing properties are noted and heat distortion temperature (HDT), reported in ° C., is measured in accordance with ASTM D–648–56 (1961).

bornyl methacrylate; a copolymer of 60 parts norbornyl methacrylate and 40 parts methyl methacrylate; a copolymer of 40 parts fenchyl methacrylate and 60 parts methyl methacrylate; a copolymer of 40 parts isobornyl methacrylate, 60 parts methyl methacrylate and 3 parts butyl acrylate; a copolymer of 40 parts isobornyl methacrylate, 60 parts methyl methacrylate, 2 parts ethyl acrylate and 8 parts styrene, all parts being on a weight basis.

The homogeneous thermoplastic vinyl chloride resin composition of this invention may be calendered to form smooth sheets or formed into conventionally sized molding powders. The composition of this invention offers many advantages over standard molding powders based on vinyl chloride. For example, the resistance to deformation at high temperatures under load is substantially improved over that of said molding powders. Also most molding powders based on vinyl chloride are difficult to mold into useful shapes in that the flow under pressure at injection molding temperatures is poor. This defect in molding processability may cause internal defects in the molded parts, surface defects on the parts, degradation of the molding powder due to over-heating, incomplete fill of complicated parts, increased gate sizes causing substantial waste, other molding difficulties, etc. On the other hand, the composition of this invention offers outstanding molding and processing characteristics. This may be demonstrated by the fact that the flow characteristics of the composition of this invention at injection molding temperatures is better than either the polyvinyl chloride or the acrylic copolymer modifier containing the bicyclic methacrylate. For example, the composition of 37.5 parts of the acrylic copolymer modifier as prepared in Example I paragraph (b) with an estimated intrinsic viscosity

TABLE I

| Composition | HDT, ° C. (264 p.s.i.) | Milling Properties | | | Vacuum Formability |
|---|---|---|---|---|---|
| | | Flux Time (Min.) | Rolling Bank | Release | |
| (a) PVC (no copolymer additive) | 75 | 1 | Poor | Exc | Poor. |
| (b) 10% (IBOMA/MMA 60/40 copol.); 90% PVC. | 79 | 2 | Fair | Exc | Fair. |
| (c) 30% (IBOMA/MMA 60/40 copol.); 70% PVC. | 85 | 5½ | Good+ | Good+ | Good. |
| (d) 50% (IBOMA/MMA 60/40 copol.); 50% PVC. | 98–100 | 8½ | ---do | Good | Exc. |
| (e) 50% (IBOMA/MMA/EA 60/38/2 copol.); 50% PVC. | 100–102 | 8½ | Exc | | Exc. |
| (f) 50% (IBOMA/MMA/EA 40/58/2 copol.); 50% PVC. | 96 | 5 | Exc | Exc | |
| (g) 50% (IBOMA/MMA 40/60 copol.); 50% PVC. | 95 | 3½ | Exc | Exc | |
| (h) 50% copolymer of Example 2 50% PVC | 95 | | Exc | Exc | Exc. |

NOTE.—Exc.=Excellent; Copol.=Copolymer.

The excellent processing and heat distortion resisting characteristics of the acrylic modified vinyl chloride resin composition of the present invention can be observed by inspection of Table I above. It can be seen that the unmodified BaCd stabilized PVC has a heat distortion temperature of only 75° C. at 264 p.s.i. and generally poor processing and working properties; an appreciable improvement in these properties is shown in the composition containing 10% of the bicyclic methacrylate-methyl methacrylate modifier additive, wherein the bicyclic methacrylate is isobornyl methacrylate, with the trend dramatically increasing at higher levels of copolymer additive; note, for example, the rise in heat distortion temperature from 75° C. to about 100° C. at the 50% modifier level.

While the particular working examples above illustrate the invention wherein the bicyclic methacrylate is isobornyl methacrylate, a similar improvement is noted in the processing and heat distortion characteristics of vinyl chloride resins when the bicyclic methacrylate in the modifier is any one of those specifically mentioned on Page 2 of the specification. Typical additional copolymer modifiers which may be used include, for example, a copolymer of 50 parts bornyl methacrylate and 50 parts methyl methacrylate; a copolymer of 40 parts methyl methacrylate and 60 parts of a mixture of 10–90 parts by weight of isobornyl methacrylate and 90–10 parts by weight of in ethylene dichloride of 0.21 (dl./gr.) and 62.5 parts polyvinyl chloride gives a Vicat softening temperature of 94 to 95° C. at 10 mils deflection, a deformation temperature under load of 85° C. at 264 p.s.i. (ASTM D–648–56–1961), and viscosity of approximately 4,000 to 4,300 poise at 400° F./1,000 seconds$^{-1}$. The viscosities at 400° F./1,000 seconds$^{-1}$ of the polyvinyl chloride and the acrylic copolymer modifier tested alone are approximately 4,800 to 4,900 and 9,800 to 9,900 poise, respectively. Therefore, the composition of this invention offers improved service temperatures as well as better processing characteristics as evidenced by the better flow at molding temperatures and pressures. Further, this composition offers significant reduction of mold defects, warping, surface blushing, and improvements in mold filling and other processing characteristics.

The composition of this invention may be fabricated into pipes or pipe sections, building panels, home siding (replacing conventional siding such as aluminum or asbestos), window components including window sash and rails, etc. by such diverse forming or molding operations as extrusion, injection molding, blow molding, rotational molding, etc. The improved resistance to deformation at elevated temperatures allows fluids at higher temperatures to be used in plastic pipe made from the composition of this invention. Further, building panels and window components made from the composition of this invention offer outstanding resistance to degradation of appearance and physical properties upon outdoor exposure and exposure to various elements. Other end-use applications will readily occur to those skilled in the art.

We claim:
1. An intimately mixed vinyl chloride resin composition of improved processing characteristics and higher heat distortion temperature, comprising a vinyl chloride polymer selected from the group consisting of homopolymers of vinyl chloride and copolymers of vinyl chloride with minor proportions of other ethylenically unsaturated monomers, and blended therewith about 5 to 50% by weight of the vinyl chloride resin composition of a copolymer modifier of
(a) 25 to 75 parts by weight of a bicyclic methacrylate of the formula:

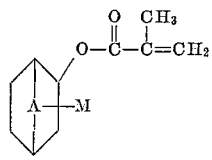

where A is selected from the group consisting of —CH$_2$—, —CH(CH$_3$)—, and —C(CH$_3$)$_2$—, and
M is selected from the group consisting of a hydrogen atom and at least one methyl group,
(b) 75 to 25 parts by weight of methyl methacrylate,
(c) 0 to 10 weight percent of the combined weight of (a) and (b) of a C$_1$ to C$_4$ alkyl acrylate, and
(d) 0 to 10 weight percent of the combined weight of (a) and (b) of styrene or a ring-substituted styrene.

2. The composition of claim 1 in which the copolymer modifier has a molecular weight in the range of about 10,000 to 2,000,000.

3. The composition of claim 1 in which in the copolymer modifier the bicyclic methacrylate is isobornyl methacrylate.

4. The composition of claim 1 in which in the copolymer modifier (c) is ethyl acrylate or butyl acrylate and is present in an amount of 1 to 5 parts by weight.

5. The composition of claim 4 in which in the copolymer modifier (d) is styrene and is present in an amount of 2 to 8 parts by weight.

6. The method of rendering a vinyl chloride polymer more amenable to processing at heat-softening temperatures and improving the heat distortion temperatures thereof which comprises adding and blending with said vinyl chloride polymer about 5 to 50% by weight of the vinyl chloride resin composition of a copolymer modifier of
(a) 25 to 75 parts by weight of a bicyclic methacrylate of the formula

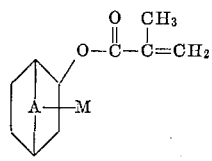

where A is selected from the group consisting of —CH$_2$—, —CH(CH$_3$)—, and —C(CH$_3$)$_2$—, and
M is selected from the group consisting of a hydrogen atom and at least one methyl group,
(b) 75 to 25 parts by weight of methyl methacrylate,
(c) 0 to 10 weight percent of the combined weight of (a) and (b) of a C$_1$ to C$_4$ alkyl acrylate and
(d) 0 to 10 weight percent of the combined weight of (a) and (b) of styrene or a ring-substituted styrene.

7. The method of claim 6 in which the bicyclic methacrylate is isobornyl methacrylate.

References Cited
UNITED STATES PATENTS

| 3,267,179 | 8/1966 | Russell et al. | 260—899 |
| 3,084,065 | 4/1963 | Bach | 117—75 |

MURRAY TILLMAN, Primary Examiner

C. J. SECCURO, Assistant Examiner

U.S. Cl. X.R.

260—23, 80.81, 86.1, 896, 897